United States Patent
Mera

(10) Patent No.: US 8,446,150 B2
(45) Date of Patent: May 21, 2013

(54) APPARATUS AND METHOD FOR LOGGING IN BOREHOLES WITH A NON-CIRCULAR SECTION

(75) Inventor: Luis E. Mera, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1305 days.

(21) Appl. No.: 12/134,804

(22) Filed: Jun. 6, 2008

(65) Prior Publication Data
US 2009/0302848 A1    Dec. 10, 2009

(51) Int. Cl.
*G01V 3/18* (2006.01)

(52) U.S. Cl.
USPC ......................................... 324/367

(58) Field of Classification Search
USPC ......................................... 324/367
See application file for complete search history.

(56) References Cited

U.S. PATENT DOCUMENTS

| | | | | |
|---|---|---|---|---|
| 2,711,482 A * | 6/1955 | Goodman | ..................... | 250/259 |
| 3,254,221 A * | 5/1966 | Saurenman | ................... | 250/268 |
| 3,379,964 A * | 4/1968 | Segesman | ..................... | 324/374 |
| 4,480,186 A * | 10/1984 | Wolk | ............................. | 250/268 |
| 4,563,757 A * | 1/1986 | Decorps et al. | ................. | 367/33 |
| 4,979,585 A * | 12/1990 | Chesnutt | ........................ | 181/102 |
| 5,101,104 A * | 3/1992 | Schroeder | ..................... | 250/268 |
| 5,551,287 A * | 9/1996 | Maute et al. | ............... | 73/152.02 |
| 6,065,218 A | 5/2000 | Edwards | | |
| 7,339,161 B2 | 3/2008 | Radtke et al. | | |
| 2002/0062992 A1* | 5/2002 | Fredericks et al. | ............. | 175/40 |
| 2004/0051531 A1* | 3/2004 | Chemali et al. | ................ | 324/367 |
| 2006/0065394 A1* | 3/2006 | Clark et al. | ................. | 166/254.2 |
| 2007/0216417 A1* | 9/2007 | Ritter et al. | ..................... | 324/367 |
| 2008/0061225 A1* | 3/2008 | Orban et al. | ................ | 250/269.3 |

* cited by examiner

*Primary Examiner* — Jay Patidar
(74) *Attorney, Agent, or Firm* — W Schmidt

(57) ABSTRACT

An apparatus for logging in a borehole comprises a longitudinal body. A pad is coupled to and radially extendable from the longitudinal body toward a wall of the borehole. The radially extendable pad comprises a sensor. The radially extendable pad is rotatable about a longitudinal axis by a predetermined angle. A method for logging a borehole comprises extending a longitudinal body into the borehole; disposing a sensor in a radially extendable pad; coupling the radially extendable pad to the longitudinal body such that the radially extendable pad is rotatable about a longitudinal axis by a predetermined angle; and extending the radially extendable and rotatable pad toward a wall of the borehole.

17 Claims, 7 Drawing Sheets

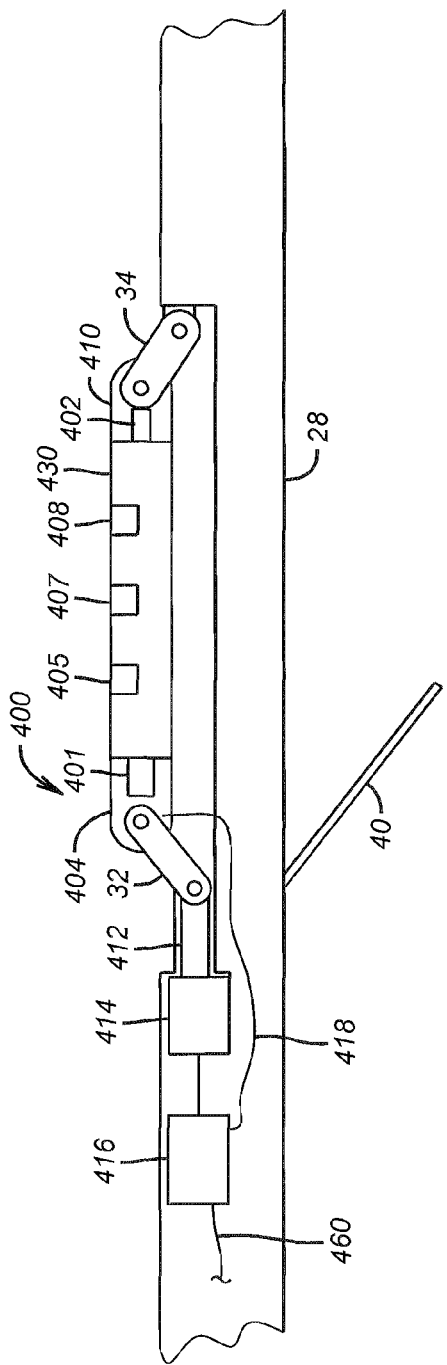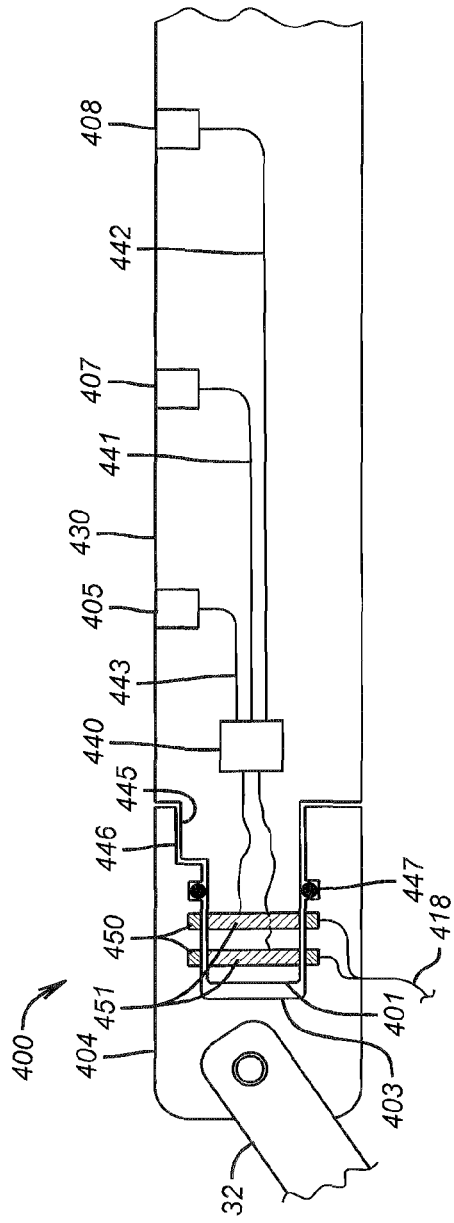

APPARATUS AND METHOD FOR LOGGING IN BOREHOLES WITH A NON-CIRCULAR SECTION

BACKGROUND

The present disclosure relates generally to formation logging and more particularly to formation logging in boreholes having a portion that is non-circular.

Logging tools may have a sensor that requires contact with the wall of the borehole, for example, micro-resistivity logging tools and density logging tools. Such tools may have their sensors mounted in a pad that extends substantially radially from the tool toward the wall of the borehole. Boreholes drilled in the earth may have portions that are non-circular. Such shapes may resemble, for example, an oval or ellipse. The radial extension of a pad from a logging tool may result in poor contact alignment between the pad and the non-circular section borehole wall.

BRIEF DESCRIPTION OF THE DRAWINGS

A better understanding of the present invention can be obtained when the following detailed description of example embodiments are considered in conjunction with the following drawings, in which:

FIG. 5A shows one example of an extendable and pivotable sensor pad;

FIG. 5B shows an enlarged view of a portion of the tool of FIG. 5A;

Figure 1:
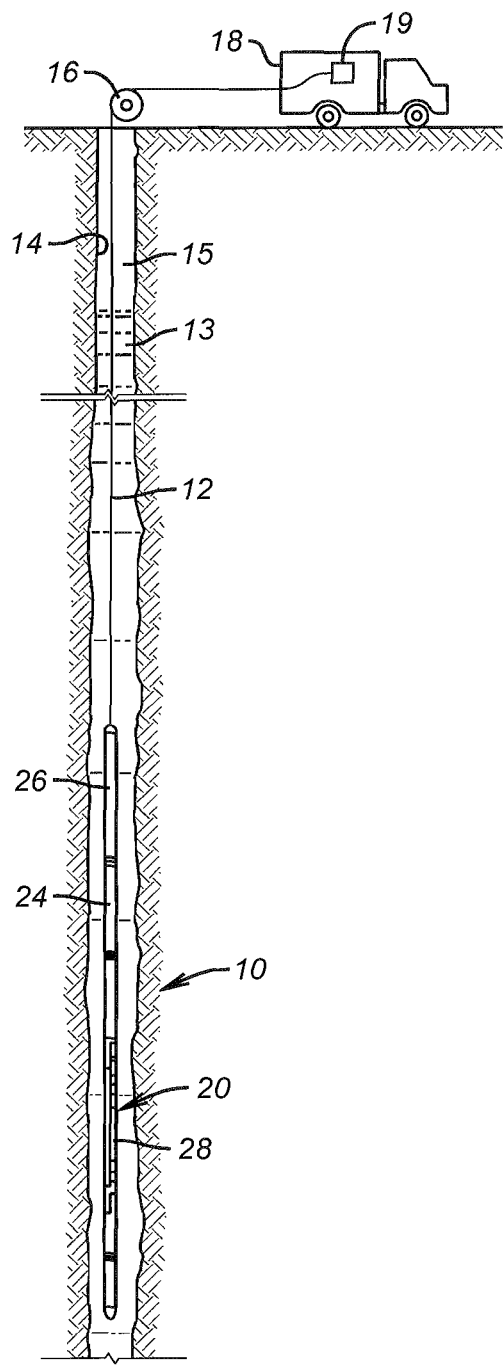
FIG. 1 illustrates an example of a logging tool string in a borehole before actuation against the borehole wall.

While the invention is susceptible to various modifications and alternative forms, specific embodiments thereof are shown by way of example in the drawings and will herein be described in detail. It should be understood, however, that the drawings and detailed description thereof are not intended to limit the invention to the particular form disclosed, but on the contrary, the intention is to cover all modifications, equivalents and alternatives falling within the scope of the present invention as defined by the appended claims.

DETAILED DESCRIPTION

Described below are several illustrative embodiments of the present invention. They are meant as examples and not as limitations on the claims that follow.

Figure 2:
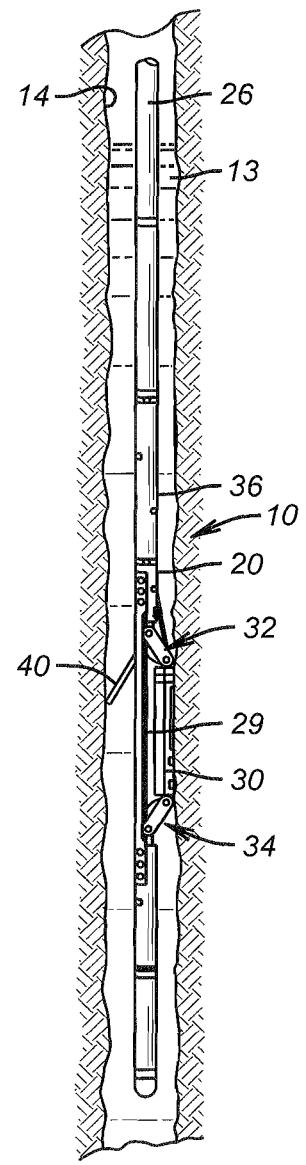
FIG. 2 shows the logging tool string of FIG. 1 with a sensor pad in contact with the borehole wall.

Referring now to FIGS. 1 and 2, a logging tool string 10 is shown suspended by a wireline cable 12 in a borehole 15 having a borehole wall 14. Borehole 15 may have non-circular sections, described later. Borehole 15 may be filled with a fluid 13, for example a drilling fluid, a completion fluid, a hydrocarbon fluid, or a combination thereof. The cable 12 may be supported by a sheave assembly 16 and controlled by a winch apparatus (not shown) mounted in truck 18. The sheave assembly 16 may also provide depth information to determine the depth of logging tool string 10 within borehole 14. Alternatively, logging tool string 10 may be deployed using other techniques, including, for example, coiled tubing or jointed tubing.

Logging tool string 10 may comprise one or more logging instruments 20. In one example, logging instrument 20 may be disposed in the lower end of tool string 10 and a controller sub 26 may be disposed on the upper end of logging tool string 10. Controller sub 26 may comprise a telemetry system for enabling communication between a surface unit 19 and downhole logging string 10. In one embodiment logging instrument 20 may be a density logging instrument comprising at least one extendable arm 40 and a sensor pad 30 for deployment into contact with borehole wall 15. Data from the logging instrument section 20 is transmitted to the controller 26 for storage and/or transmission to the surface via the wireline cable 12 to recording and display equipment (not shown) in surface unit 19. In one operational example, logging tool string 10 may be lowered to a preselected depth in borehole 14, and sensor pad 30 and extendable arm 40 may be actuated and deployed into contact with borehole wall 15. Logging tool string 10 may be raised at a predetermined velocity through borehole 14 to perform the logging operation.

FIG. 2 shows logging instrument 20 of FIG. 1 disposed in wellbore 14 in greater detail after deployment of sensor pad 30 and extendable arm 40. Logging instrument 20 may comprise a carrier body 28 comprising a cavity 29 (seen more clearly in FIGS. 3 and 4) that houses sensor pad 30. Carrier body 28 may also comprise an extendable arm 40. In FIG. 2, extendable arm 40 is shown deployed into contact with the borehole wall 14 for forcing the longitudinal axis of logging instrument 20 toward the opposite side of the borehole in the direction of deployment of sensor pad 30.

In one embodiment, sensor pad 30 comprises linkage assemblies 32 and 34. An actuator 36 connects to upper linkage 32 and moves axially to extend and retract sensor pad 30. Actuator 36 may be controllable to apply a predetermined force load between sensor pad 30 and borehole wall 14. Alternatively, linkage assemblies 32 and 34 may be spring loaded for setting a preselected sensor pad 30 force for loading against borehole wall 14. In one embodiment, actuator 36 may comprise a controllable extendable and retractable hydraulic piston coupled to at least one of linkage 32 and linkage 34. Alternatively, actuator 36 may comprise an extendable and retractable motor driven shaft coupled to at least one of linkage 32 and linkage 34. In one embodiment, actuator 36 may extend sensor pad 30 and extendable arm 40 substantially simultaneously.

Figure 3:
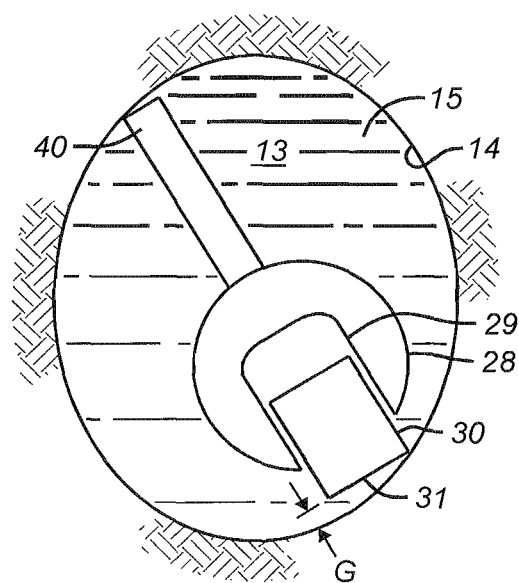
FIG. 3 shows a borehole view of a logging string in a non-circular section of a borehole with poor alignment between a sensor pad and the borehole wall.

FIG. 3 shows a borehole view of logging string 10 in a non-circular section of borehole 15. In one deployment example, when arm 40 and sensor pad 30 are extended, the non-circular nature of borehole 15 results in a gap G between the end surface 31 of pad G and the borehole wall 15. Gap G may be filled with fluid 13 and/or a filter cake of solid particles from fluid 13. The poor wall contact between pad surface 31 and borehole wall 15 and the degradation caused by fluid 13 in gap G may cause a substantial error in logging measurements made by sensors in pad 30. For example, density sensors and micro-resistivity sensors each require wall contact over substantially all of sensor pad surface 31 for high quality measurements.

Figure 4:
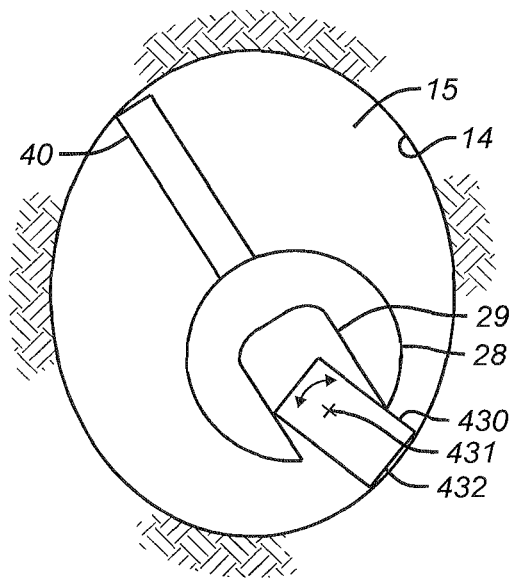
FIG. 4 shows one embodiment of a pivotable sensor pad in enhanced contact with the borehole wall.

FIG. 4 shows one embodiment of the present invention wherein an extendable sensor pad 430 is also pivotable around a longitudinal axis 431 to allow sensor pad surface 432 to align with borehole wall 14 to enhance the contact between pad surface 432 and borehole wall 14 and the quality of measurements by sensors in pad 430. As used herein, the terms longitudinal and longitudinally are intended to describe direction and/or motion along an axis substantially parallel to the long axis of the logging tool string.

FIG. 5A shows one example of an extendable and pivotable sensor pad 430 for use with a density tool. As shown, controller 416 directs actuator 414 to extend member 412 longitudinally to pivot linkages 32 and 34 outward from body 28 thereby extending sensor pad 430 outward toward the borehole wall. In one example, extendable arm 40 may be substantially simultaneously extended toward a portion of the borehole wall diametrically opposite that engaged by sensor pad 430 thereby forcing sensor pad 430 into contact with borehole wall 15 (see FIGS. 2-4).

In one example a radioactive source 405 emits gamma rays into the surrounding formation. Sensors 407 and 408 detect radiation which is emitted by the source and scattered by the formation back toward the sensors. The scatter reaction may be primarily Compton scattering, and the number of Compton scattering collisions within the formation can be related to electron density of materials within the formation. Using calibration techniques known in the art, a measure of electron density of the formation can be related to bulk density of the formation. In one embodiment, the radioactive source may be a cesium isotope, for example $Cs_{137}$. Sensors 407 and 408 may be scintillation crystal sensors known in the art.

In one embodiment, pivotable sensor pad 430 comprises a conductor shaft 401 on one end and a pivot shaft 402 on an opposite end. Conductor cap 404 and pivot cap 410 are formed to receive conductor shaft 401 and pivot shaft 402, respectively. Conductor cap 404 and pivot cap 410 are coupled to pivot linkages 32 and 34, respectively. Conductor cap 404 and conductor shaft 401 may comprise a connector assembly 400.

FIG. 5B shows an enlarged view of a portion of the tool of FIG. 5A. In this example, connector assembly 400 comprises conductor cap 404 which has a cavity 403 sized to receive conductor shaft 401. An elastomer seal 446 acts between cap 404 and shaft 401 to prevent fluid intrusion into cavity 403. Conductor rings 451 may be located circumferentially around conductor shaft 401. Mating contacts 450 may be located in internal grooves (not shown) in conductor cap 404 such that conductor rings 451 and contacts 450 are aligned with each other when conductor shaft 401 is properly located in cavity 403. Power and signals to and from sensors and electronics in pad 430 to controller 416 in body 28 may be transmitted by techniques known in the art. In one example, an electronics module 440 is located in pad 430 to condition signals from sensors 407 and 408 for transmission to controller 416. In addition, electronics module 440 may control shielding for source 405 to control the emission of radiation from the source into the formation, using techniques known in the art. Wires 418 may conduct signals and/or power between contacts 450 and controller 416. Wires 418 may be located in passages formed in body 28 but such passages are omitted here for clarity.

Figure 6:
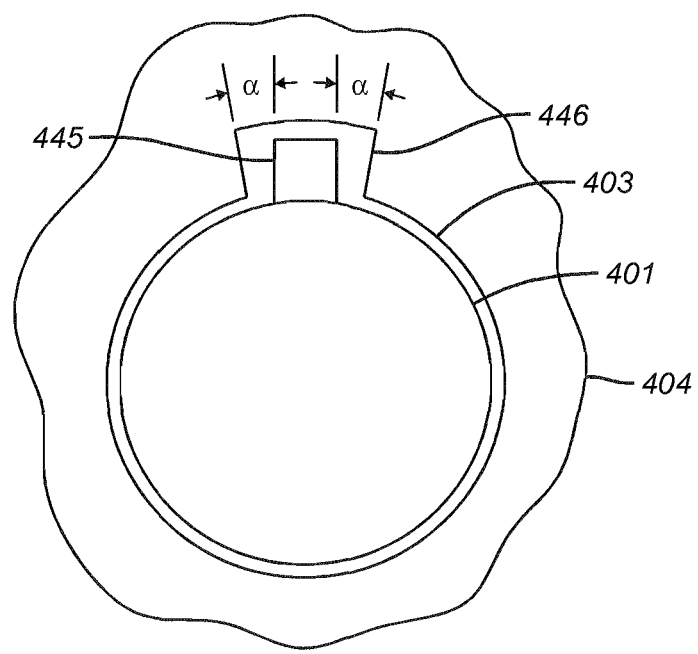
FIG. 6 shows a view of a key and slot arrangement that allows rotational tilting of the sensor pad.

In one illustrative embodiment, also referring to FIG. 6, key 445 is attached to shaft 401 and extends into slot 446 at assembly. Slot 446 is sized such that key 445 and attached shaft 401 and sensor pad 430 can rotate, also called tilt, in either direction from a nominally centered position about a longitudinal axis through shaft 401, by a predetermined angle, $\pm\alpha$. In one embodiment, $\alpha$ is no greater than about 10°. Key 445 may be attached to shaft 401 using any suitable mechanical technique, including, but not limited to: welding, brazing, adhesive attachment, and attachment by mechanical fasteners. Alternatively, key 445 may be formed in shaft 401 during manufacturing, using techniques known in the art.

Figure 7:
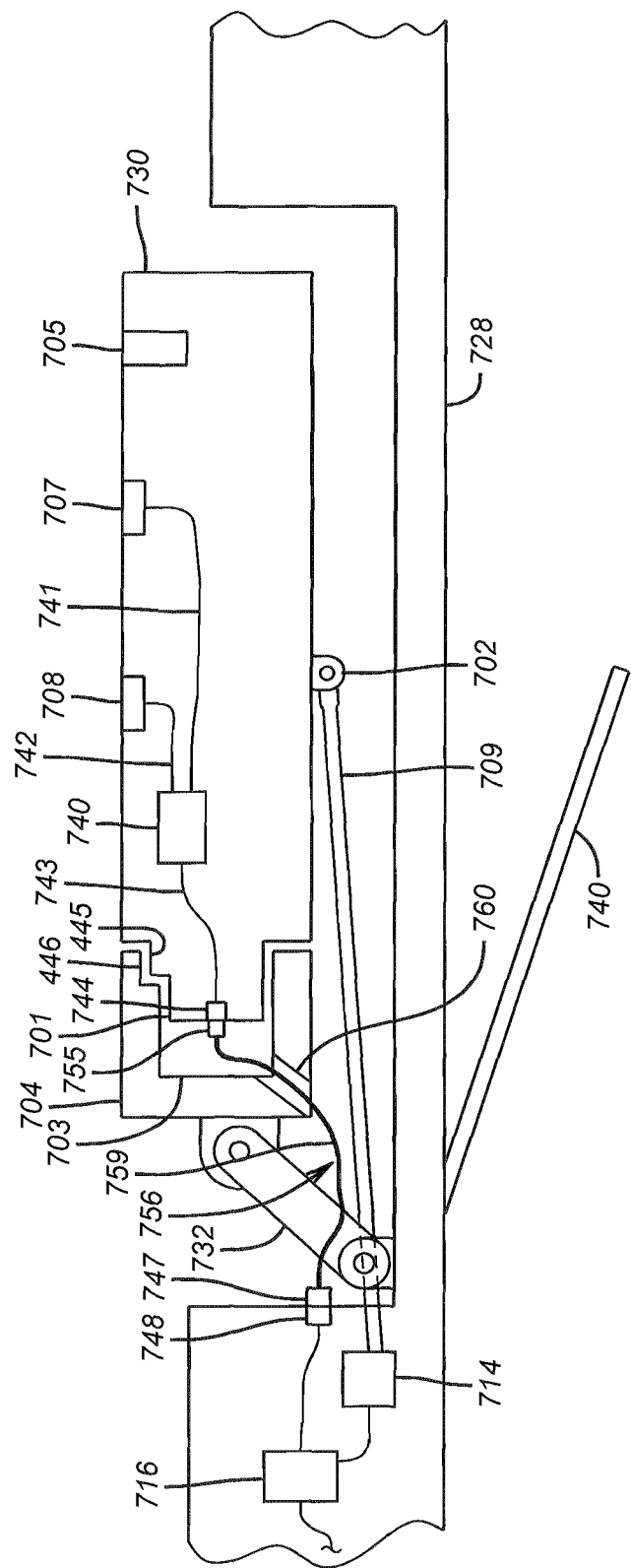
FIG. 7 shows another example of an extendable and pivotable sensor pad.

FIG. 7 shows another example of an extendable and pivotable sensor pad 730 for use with a density tool. As shown, controller 716 directs actuator 714 to extend member 709 longitudinally to extend sensor pad 730 outward toward the borehole wall. In one example, linkage 732 is also coupled between body 728 and sensor pad 730 and acts cooperatively with member 709 to extend sensor pad 730 substantially radially outward from body 728. In one example, extendable arm 740 may be substantially simultaneously extended toward a portion of the borehole wall (see FIGS. 3 and 4) substantially diametrically opposite that engaged by sensor pad 730 thereby forcing sensor pad 730 into contact with the borehole wall. Sensor pad 730 may comprise a source 705 and sensors 707 and 708 similar to those described previously. Conductors 741 and 742 may be routed to electronics module 740. Electronics module 740 may condition signals from sensors 707 and 708 and transmit the conditioned signals to controller 716. End cap 704 comprises a cavity 703 formed to accept pivot shaft 701 of sensor pad 730. Slot 446 in end cap 704 is formed to accept key 445 on pivot shaft 701 as described with respect to FIG. 6, and allows a predetermined angular rotation about a longitudinal axis through shaft 701. In this example, the pin connection 702 between member 709 and sensor pad 730 is designed, using techniques known in the art, to accommodate the angular rotation allowed by the slot/key combination described.

In this example, electrical connection between controller 716 and electronics module 740 is partially enabled by umbilical cord 756 which may comprise cable 759 and connectors 755 and 747 on opposite ends thereof. Connectors 755 and 747 are mateable with connectors 744 and 748 respectively. In this example, the length of umbilical cord 756 provides sufficient rotational flexibility to accommodate the allowable rotational movement of sensor pad 730.

Figure 8:
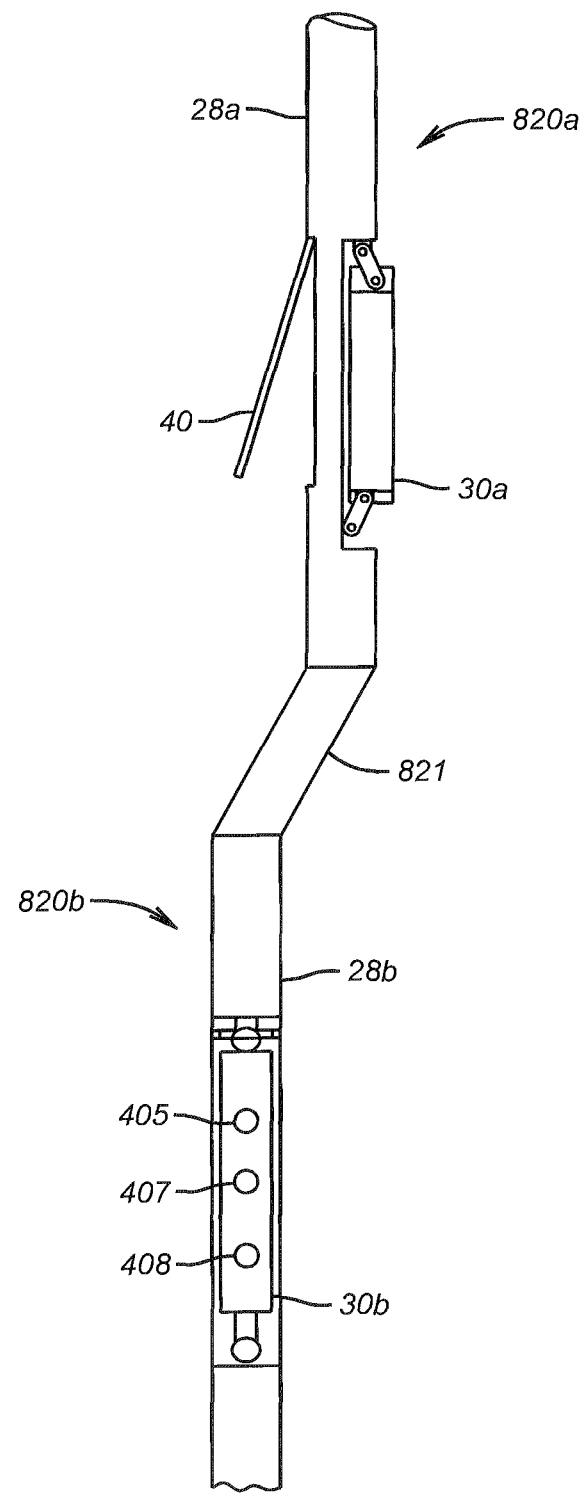
FIG. 8 show a pair of logging instruments with rotatable sensor pads connected by an offset sub.
Figure 9:
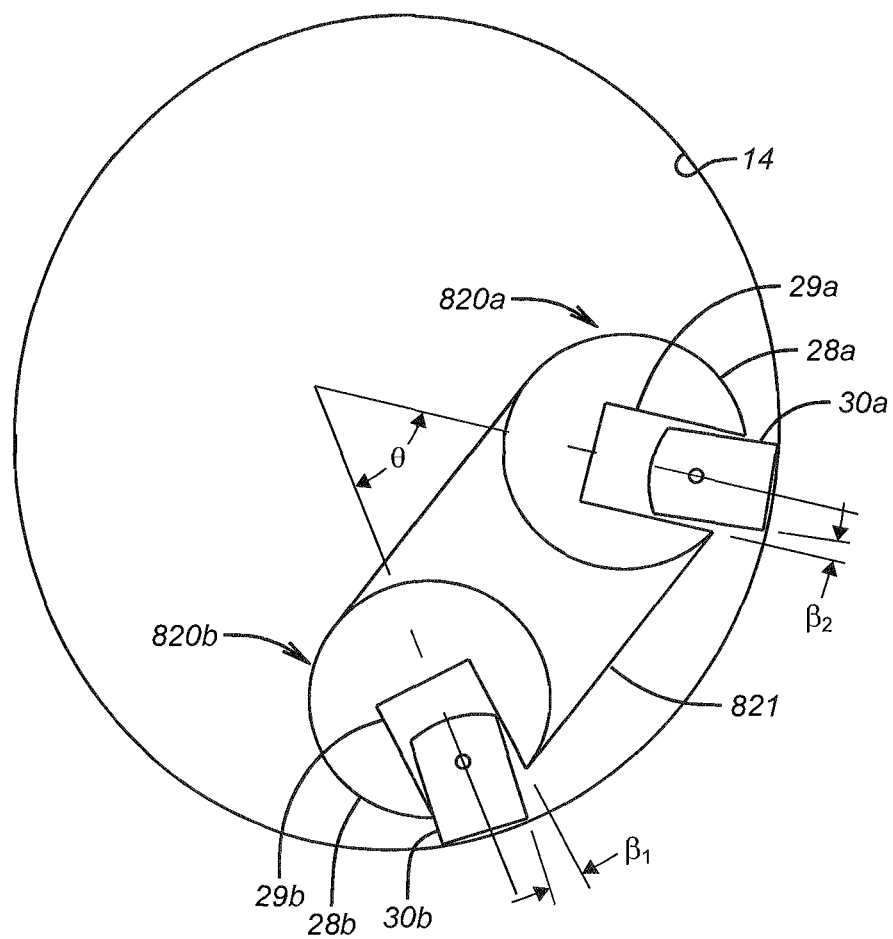
FIG. 9 show a borehole view of the orientation of logging instruments of FIG. 7.

Also referring to FIGS. 8 and 9, in one embodiment, two logging instruments 820a and 820b may be coupled together by an offset sub 821. Each logging instrument may be similar to any of those described previously, or any other logging instrument known in the art having an extendable sensor pad requiring contact with the borehole wall. Offset sub 821 is keyed to logging instrument 820a and 820b such that offset sub 821 establishes an azimuthal spacing of sensor pads 30a and 30b of an angle $\theta$, where $\theta$ is no greater than 80°. As shown in FIG. 8, the sensor pads 30a and 30b may tilt by angles $\beta_1$ and $\beta_2$ to accommodate the non-circular borehole wall 14, where the magnitudes of $\beta_1$ and $\beta_2$ are each no greater than 10°.

Numerous variations and modifications will become apparent to those skilled in the art. It is intended that the following claims be interpreted to embrace all such variations and modifications.

What is claimed is:

1. An apparatus for logging in a borehole comprising:
   longitudinal tool body having a first longitudinal axis therethrough;
   a longitudinal pad having a longitudinally extending shaft formed on an end thereof,
   a radioactive source disposed in the longitudinal pad to emit radiation into a formation surrounding the borehole;

a sensor disposed in the longitudinal pad and longitudinally spaced apart from the radioactive source to detect scattered radiation from an interaction of the source radiation with the formation;

a cap having a longitudinal cavity formed therein to receive the longitudinally extending shaft to allow relative rotation of the longitudinal pad relative to the cap about a second longitudinal axis extending through the cap cavity, the shaft, and the longitudinal pad by no greater than a predetermined angle to allow the longitudinal pad to align with a wall of the borehole when extended thereto; and a linkage coupled on a first end to the longitudinal body and on a second end to the cap, the linkage pivotable with respect to the tool body and the cap to allow the longitudinal pad to be radially extended from the tool body to contact a wall of the borehole such that the second longitudinal axis and the first longitudinal axis remain substantially parallel.

2. The apparatus of claim 1 wherein the predetermined angle is about ±10°.

3. The apparatus of claim 1 wherein the sensor comprises a scintillation detector.

4. The apparatus of claim 1 wherein the sensor comprises a plurality of longitudinally spaced apart sensors.

5. The apparatus of claim 1 further comprising a connector transmitting power and signals between the longitudinal tool body and the sensor.

6. The apparatus of claim 1 further comprising:

a second longitudinal tool body having a third longitudinal axis therethrough;

a second longitudinal pad having a second longitudinally extending shaft formed on an end thereof, a second radioactive source disposed in the second longitudinal pad to emit radiation into the formation surrounding the borehole;

a second sensor disposed in the second longitudinal pad and longitudinally spaced apart from the second radioactive source to detect scattered radiation from an interaction of the second source radiation with the formation;

a second cap having a longitudinal cavity formed therein to receive the second longitudinally extending shaft to allow relative rotation of the second longitudinal pad relative to the second cap about a fourth longitudinal axis extending through the second cap cavity, the second shaft, and the second longitudinal pad by no greater than the predetermined angle to allow the second longitudinal pad to align with the wall of the borehole when extended thereto; and a second linkage coupled on a first end to the second longitudinal tool body and on a second end to the second cap, the second linkage pivotable with respect to the second tool body and the second cap to allow the second longitudinal pad to be radially extended from the tool body to contact the wall of the borehole such that the fourth longitudinal axis and the third longitudinal axis remain substantially parallel; and an offset sub coupling the longitudinal body and the second longitudinal body to establish an azimuthal spacing of the longitudinal pad and the second longitudinal pad no greater than a second predetermined angle.

7. The apparatus of claim 6 wherein the second predetermined angle is 80°.

8. An apparatus for logging in a borehole comprising:

a first longitudinal tool body having a first longitudinal axis therethrough;

a first longitudinal pad having a first longitudinally extending shaft formed on an end thereof;

a first radioactive source disposed in the first longitudinal pad to emit radiation into a formation surrounding the borehole;

a first sensor disposed in the first longitudinal pad and longitudinally spaced apart from the first radioactive source to detect scattered radiation from an interaction of the source radiation with the formation;

a first cap having a first longitudinal cavity formed therein to receive the first longitudinally extending shaft to allow relative rotation of the first longitudinal pad relative to the first cap about a second longitudinal axis through the first cap cavity, the first shaft, and the first longitudinal pad by no greater than a predetermined angle to allow the first longitudinal pad to align with a wall of the borehole when extended thereto; and a first linkage coupled to a first end to the first longitudinal body and to a second end of the first cap, the first linkage pivotable with respect to the first tool body and the first cap to allow the first longitudinal pad to be radially extended from the tool body to contact a wall of the borehole such that the second longitudinal axis and the first longitudinal axis remain substantially parallel;

a second longitudinal tool body having a third longitudinal axis therethrough;

a second longitudinal pad having a second longitudinally extending shaft formed on an end thereof, a second radioactive source disposed in the second longitudinal pad to emit radiation into the formation surrounding the borehole;

a second sensor disposed in the second longitudinal pad and longitudinally spaced apart from the second radioactive source to detect scattered radiation from an interaction of the second source radiation with the formation;

a second cap having a second longitudinal cavity formed therein to receive the second longitudinally extending shaft to allow relative rotation of the second longitudinal pad relative to the second cap about a fourth longitudinal axis through the second cap cavity, the second shaft, and the second longitudinal pad by no greater than the predetermined angle to allow the second longitudinal pad to align with the wall of the borehole when extended thereto; and a second linkage coupled on a first end to the second longitudinal tool body and on a second end to the second cap, the second linkage pivotable with respect to the second tool body and the second cap to allow the second longitudinal pad to be radially extended from the tool body to contact the wall of the borehole such that the third longitudinal axis and the first longitudinal axis remain substantially parallel; and an offset sub coupling the longitudinal body and the second longitudinal body to establish an azimuthal spacing of the longitudinal pad and the second longitudinal pad no greater than a second predetermined angle.

9. The apparatus of claim 8 wherein the second predetermined angle is 80°.

10. The apparatus of claim 8 wherein the first predetermined, angle is about ±10°.

11. The apparatus of claim 8 wherein the first sensor and the second sensor comprise a scintillation detector.

12. The apparatus of claim 8 wherein the first sensor comprises a plurality of longitudinally spaced apart first sensors and the second sensor comprises a plurality of longitudinally spaced apart second sensors.

13. The apparatus of claim 8 further comprising a first connector transmitting power and signals between the first longitudinal tool body and the first sensor and a second connector transmitting power and signals between the second longitudinal tool body and the second sensor.

14. A method for logging a borehole comprising:
- extending a longitudinal tool body having a first longitudinal axis therethough into the borehole;
- disposing, a radiation source in a radially extendable longitudinal pad;
- disposing a sensor longitudinally spaced apart from the radiation source in the radially extendable longitudinal pad;
- coupling the radially extendable longitudinal pad to the longitudinal body such that the radially extendable longitudinal pad is rotatable by no more than a predetermined angle about a second longitudinal axis through the longitudinal pad where the second longitudinal axis is substantially parallel to the first longitudinal axis; and
- extending the radially extendable and rotatable pad from the tool body to contact a wall of the borehole such that the radially extendable longitudinal pad aligns with the wall of the borehole.

15. The method of claim 14 wherein the predetermined angle is about ±10°.

16. The method of claim 14 further comprising:
- coupling an offset sub between the longitudinal tool body and a second longitudinal body wherein the second longitudinal tool body has a third longitudinal axis therethrough;
- disposing a second radiation source in a second radially extendable longitudinal pad;
- disposing a second sensor in the second radially extendable longitudinal pad;
- coupling the second radially extendable longitudinal pad to the second longitudinal body such that the second radially extendable longitudinal pad is rotatable by no more than the predetermined angle about a fourth longitudinal axis through the longitudinal pad where the fourth longitudinal axis is substantially parallel to the third longitudinal axis; and
- azimuthally spacing the radially extendable longitudinal pad and the second radially extendable longitudinal pad no greater than a second predetermined angle.

17. The method of claim 16 wherein the second predetermined angle is 80°.

\* \* \* \* \*